United States Patent [19]

Le Frére

[11] 3,973,878
[45] Aug. 10, 1976

[54] METHOD AND DEVICE FOR ELECTROMAGNETIC PUMPING BY CONDUCTION OF LIQUID METALS HAVING LOW ELECTRICAL CONDUCTIVITY

[75] Inventor: Jean-Paul Le Frére, Villejuif, France

[73] Assignee: Groupement pour les Activities Atomiques et Avancees "GAAA", Le Plessis Robinson, France

[22] Filed: Feb. 12, 1975

[21] Appl. No.: 549,261

[30] Foreign Application Priority Data

Feb. 21, 1974 France ............................ 74.05958

[52] U.S. Cl. .............................................. 417/50
[51] Int. Cl.² ............................................ H02N 4/20
[58] Field of Search ......................... 417/50; 310/11

[56] References Cited
UNITED STATES PATENTS

| | | | |
|---|---|---|---|
| 2,756,678 | 7/1956 | Collins | 417/50 |
| 3,785,744 | 1/1974 | Carbonnel | 417/50 |
| 3,787,143 | 1/1974 | Carbonnel et al. | 417/50 |
| 3,809,497 | 5/1974 | Carbonnel et al. | 417/50 |
| 3,837,763 | 9/1974 | Ertaud et al. | 417/50 |

Primary Examiner—William L. Freeh
Assistant Examiner—Edward Look
Attorney, Agent, or Firm—Sughrue, Rothwell, Mion, Zinn & Macpeak

[57] ABSTRACT

The invention is related to a method for pumping of liquid metals having a low electrical conductivity. To lower the resistance of the conductive spire containing liquid metal to be pumped, a tape formed by a conductive metal such as copper or nickel is inserted in that spire. The tape is interrupted at the level of the air gap of the main magnetic circuit at least when the conductive spire passes through that air gap.

15 Claims, 5 Drawing Figures

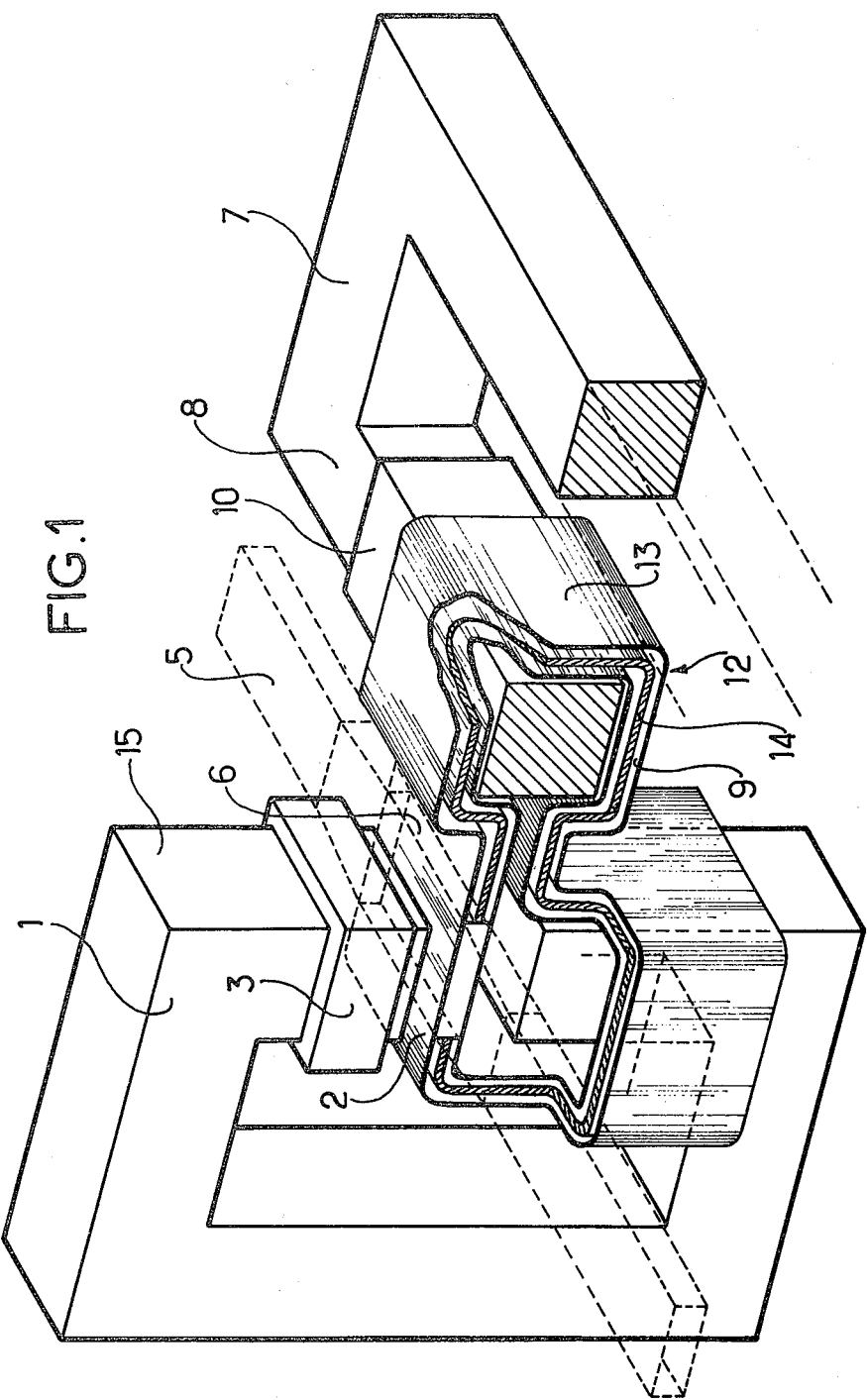

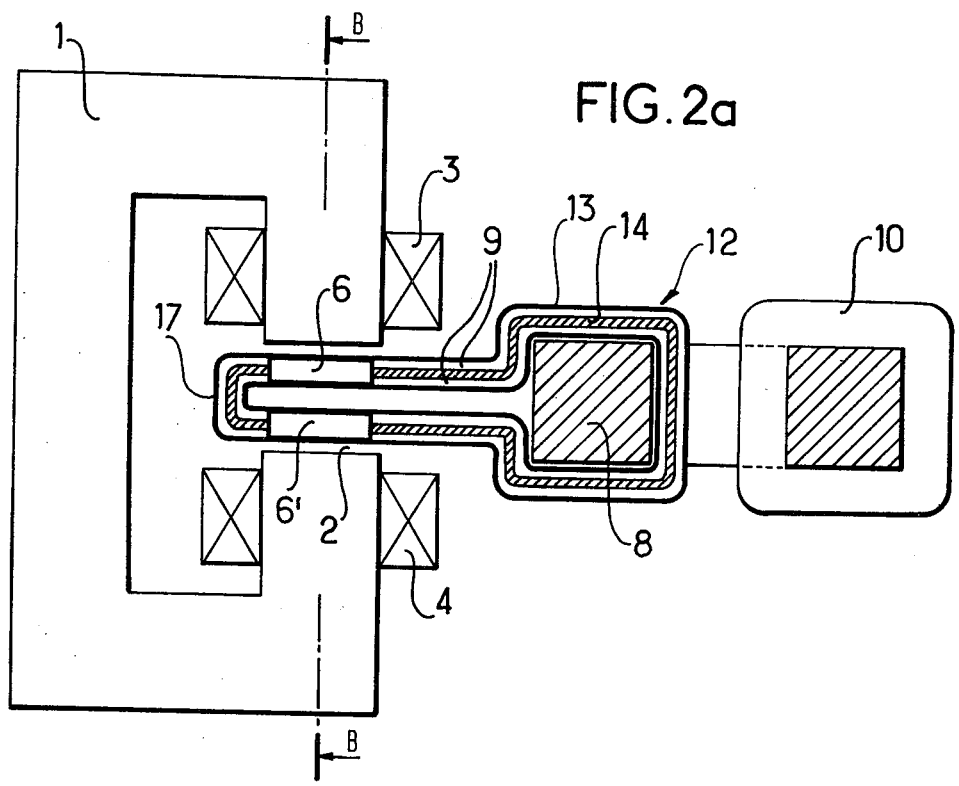
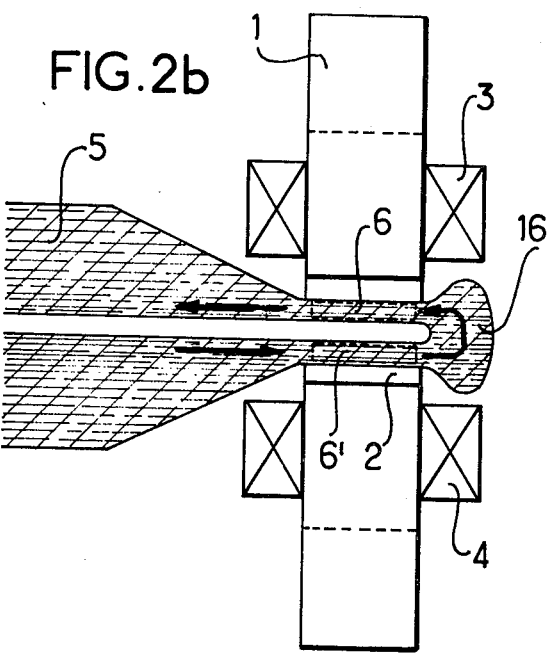

METHOD AND DEVICE FOR ELECTROMAGNETIC PUMPING BY CONDUCTION OF LIQUID METALS HAVING LOW ELECTRICAL CONDUCTIVITY

BACKGROUND OF THE INVENTION

1. Field of the Invention

The present invention concerns a method for electromagnetic pumping by conduction of liquid metals having low electrical conductivity, as well as a device implementing that method.

2. Description of the Prior Art

It is known that in conduction type electromagnetic pumps for liquid or molten metals of the conventional type, an electric current called a conduction current is made to pass in a direction perpendicular to the flux of molten metal to be pumped. At the same time, a magnetic field in a direction which is perpendicular simultaneously to the flux of molten metal and to the electrical conduction current is set up. The result of this according to Laplace's law, is that a force, directed along the axis of the pumping duct in which the molten metal flows, originates in the section of molten metal subjected to the combined action of the magnetic field and of the conduction current.

In alternating current type conduction pumps, the conduction current which crosses the flux of liquid metal is set up in the majority of cases, by means of a conductive spire forming the secondary winding of a transformer, so that very intense currents are thus very easily obtained in that conductive spire. It is therefore indispensable to reduce to the strict minimum the contact resistance through the pumping duct, between the conductive spire and the section of molten metal which the conduction current must cross. A great progress has been made in that field by forming the conductive spire with the molten metal itself and by providing, at the level of the conductive spire, an opening in the duct. In these conditions, the resistance of the circuit formed by the conductive spire is reduced to a very low level each time the metal to be pumped is itself a good electrical conductor, this being the case, more particularly, when molten aluminium is to be pumped. Thus, the use of electrodes in contact with the molten metal flowing in the pumping duct is also avoided.

This method becomes defective, however, when the molten metal to be pumped has low electrical conductivity. Indeed, in that case, losses by Joule effect would be very high. The giving off of heat which would result therefrom would be liable, more particularly, to give rise to the evaporation of the liquid or molten metal and the damaging of the pump. The result of this is that the method of electrical electromagnetic pumping by conduction, improved by the use of a conductive spire of liquid metal could not be applied without modification to the pumping of liquid or molten metals having low electrical conductivity.

One of the aims of the present invention has been to improve a very simple method making it possible to use a conductive spire of molten metal to feed the active section of the pumping duct with current while keeping the resistance of the circuit formed by the spire within acceptable limits.

SUMMARY OF THE INVENTION

The object of the invention is therefore firstly an electromagnetic pumping method suitable for liquid or molten metals having low electrical conductivity, consisting in using an electromagnetic pump comprising a pumping duct in which the liquid or molten metal flows, at least a section of the said duct being crossed simultaneously by an electrical current flowing in a direction perpendicular to the pumping duct and by a magnetic field perpendicular simultaneously to the pumping duct and to the conduction current and in which the conduction current originates in a conductive spire limited by a casing filled with the metal to be pumped, characterized in that a bar made of a material which is a very good electrical conductor, not sensitive to the chemical action of the said conductive metal, is immersed in the said conductive spire.

Another aim of the invention is to improve a pumping device making use of the method according to the invention while taking up the smallest possible volume.

The device for electromagnetic pumping by conduction making use of the method described above comprising;

A first magnetic circuit setting up, in its air gap, a magnetic field;

A pumping duct in which liquid or molten metal to be pumped, kept at one of its ends in communication with a liquid or molten metal receptacle, flows, the said duct crossing the air gap of the first magnetic circuit;

The axis of the said pumping duct then being perpendicular to the direction of the magnetic field;

A conductive spire containing liquid or molten metal crossing the said pumping duct at least once in the air gap of the said first magnetic circuit, through openings provided in the said pumping duct;

A second closed magnetic circuit, provided with at least one induction spire and one of whose branch connections is surrounded by the liquid metal conductive spire;

characterized in that the conductive bar immersed in the liquid metal spire is interrupted at least once at the level of the air gap.

To prevent the forming of interference currents, the liquid or molten metal spire is contained in an insulating casing which is made of a ceramic insulating material or a synthetic material. It may contingently be made of a non-magnetic conductive material such as austenitic stainless steel, but then, the casing may become the seat of extra losses.

It may easily be conceived that in such an embodiment, the induced current which originates in the liquid or molten metal spire will flow mainly in the mass of the conductive bar and the losses by Joule effect may thus be brought to perfectly permissible values. In the vicinity of the air gap, the conductive bar contained in the liquid metal is interrupted both to prevent the forming of interference currents due to the magnetic field existing in the air gap and to avoid disturbing the flow of the liquid or molten metal flux in its insulating duct. The conductive bar being in electrical contact with the liquid or molten metal over a very large surface, area the contact resistance is brought to a very low figure so that the only appreciable resistance giving rise to losses by Joule effect is that which is produced inside the insulating duct, in the active section of the liquid or molten metal since the conductive bar has little resistance. That heat is dissipated permanently by the metal flow pumped and does not contribute to the raising of the temperature in the active section beyond acceptable limits.

Furthermore, the losses by Foucault currents within the liquid or molten metal become absolutely negligible because of the low conductivity of the liquid metal.

The result of this is that the losses taken as a whole are reduced to a minimum and that, consequently, the efficiency of the pump is very high.

In numerous cases, it is fairly difficult for the liquid or molten metal to wet a metallic part.

The result of this is that if the conductive spire were constituted only by a conductive bar without being immersed in a molten metal duct, there would arise the problem of electrical contact between the bar and the flow of molten metal flowing in the insulating duct. Certainly, it would sometimes be possible to find electrodes crossing the insulating duct and having the same coefficient of expansion as the latter, but then it would be necessary, again, to solve the problems of electrical contact between the electrodes and the bar on the one hand and between the electrodes and the liquid or molten metal flux on the other hand. According to the type of the liquid metal to be pumped, the problem thus set can or cannot be solved. But in all cases, it would entail a complication in manufacturing which would have to be preceded by thorough experimental work, whereas the method according to the invention makes it possible to afford an easy solution in all cases of an industrial kind.

The scope of the invention will be better understood on referring to three examples of embodiment described herebelow in relation to the three accompanying drawings. Like elements carry like numerical designations.

BRIEF DESCRIPTION OF THE DRAWINGS

FIG. 1 is a perspective view, partially broken away of a circuit where the conductive spire passes only once through the air gap of the first magnetic circuit;

FIG. 2a and is a sectional view of a second embodiment of the invention in which the conductive spire passes twice through the air gap;

FIG. 2b is a vertical section of the pump of FIG. 2a, taken about line B-B.

DESCRIPTION OF PREFERRED EMBODIMENTS

Figure 3A:
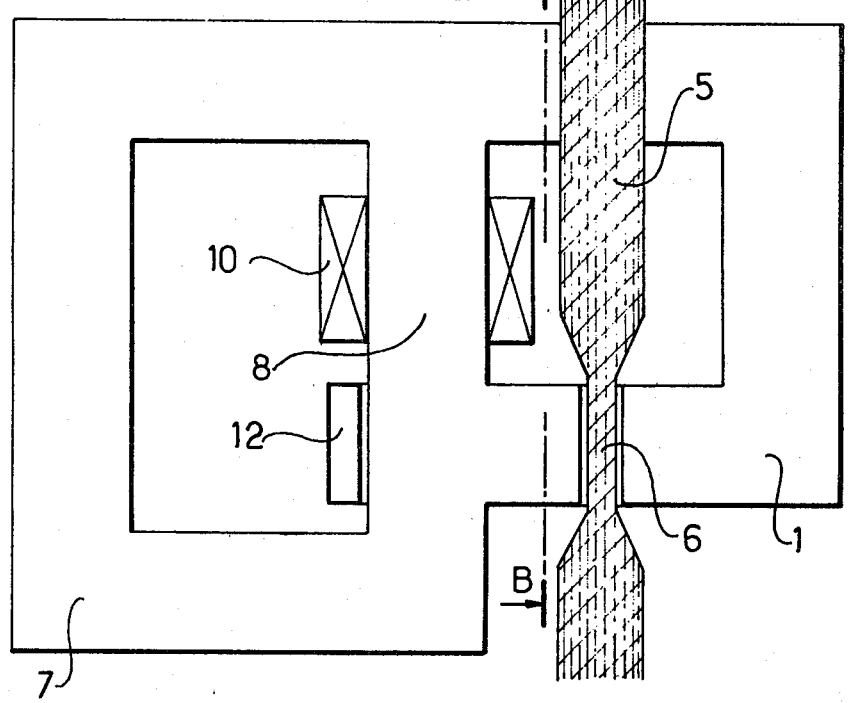
FIG. 3a is a sectional view of a third embodiment of the invention implementing only one magnetic circuit.

FIG. 1 shows a perspective view of an electromagnetic conduction pump for pumping mercury. It is known that mercury is a relatively poor conductor, since its resistivity at 100°C is in the order of 100 microhms per centimetre. Moreover, it does not easily wet the materials with whicn it comes into contact and hence has high contact resistance. The pumping of that liquid metal with a conventional pump having a conductive spire formed by liquid metal leads to a rise in temperature of the mercury contained in the spire rapidly reaching prohibitive figures. The device described hereinbelow has given complete satisfaction during long tests lasting several hundreds of hours.

In FIG. 1, the first magnetic circuit 1 may be seen with an air gap 2, in which a winding 3 through which an alternating current having an industrial frequency flows gives rise, in the air gap 2, to an alternating magnetic field. In that air gap, the pumping duct 5 which is flared in the vicinity of the air gap in one direction and narrows in a perpendicular direction is made to pass so that in the air gap, it is in the shape of a very flat duct 6; it is in this pumping duct that the liquid metal pumped flows into a vat (not shown) in which the lower part of the pumping duct 5 is immersed. The second magnetic circuit 7 is continuous and does not comprise any air gap. Its column 8 has two windings only one of which is shown at 10. The conductive spire 12 surrounds that column 8. That spire 12 is constituted essentially by an envelope 13 which is flat like a tape, the thickness of that conductive spire being equal to the thickness of the pumping duct 6 in the air gap. The conductive spire crosses through the pumping duct by openings formed on either side of the pumping duct 6. The casing 13 of the conductive spire is made of a synthetic insulating material. A tape or flat copper bar 14, is inserted in the spire and is immersed in mercury 9 in the conductive spire 12. The thickness of that tape is calculated as a function of the intensity of the current which is to be made to pass through the spire. Indeed, taking into account the resistivity of copper and of mercury, it will be understood that if a cross-seciton equal to that of the liquid metal in the conductive spire is imparted to the copper tape, the ratio of the resistances will be in the order of 2 to 100 and the current flowing in the mercury will be only a fiftieth of the current flowing in the copper. The losses by Joule effect in the mercury which are proportional to the square of the current which flows therein may thus be brought down to a negligible figure.

The copper tape is interrupted at the level of the air gap. Nevertheless, as the copper tape 14 is completely immersed in mercury, the zone where the current will emerge from the copper tape 14 to cross the liquid metal flux will extend over a fairly large surface, thus limiting the losses by Joule effect due to the contact resistance, to a strict minimum.

The heat thus given off is transmitted to the mercury flux pumped and does not cause any appreciable local heating.

At the output of the air gap 2, the conductive spire 12 is curved by 90° like a tape, so as to pass in front of the active column 15 of the magnetic circuit 1. Then, the conductive spire 12 is curved again by 90° so as to be again in a plane parallel to that of the air gap.

The pumping duct 6 being fed with mercury, the latter fills the whole spire. The second closed magnetic circuit fitted with the windings such as 10 induces, in the conductive spire 12, like a transformer, an intense alternating current having the same frequency as that of the magnetic field. The feeding of the winding such as 3 and that of the windings 10 is effected in such a way that the current set up in the conductive spire 12 is in phase with the magnetic field set up in the air gap 2.

The pump described hereinabove has been subjected to various modifications.

A first variant which is an advantage consists in folding the conductive spire 12 round an axis parallel to the plane of the air gap and in making it pass again through the air gap.

If there is a gain in simplicity in the manufacturing of the conductive spire 12, on the other hand, the reluctance of the air gap is increased in great proportions, but that second pass has a compensating action cancelling the forming of an interference magnetic field which would have a tendency to be formed: on the other hand, the copper tape partly fulfills the function of a screen with respect to the magnetic field because of the Foucault currents which form in the copper tape in the air gap.

Another variant in which the conductive spire 12 passes in the same conditions twice through the air gap makes it possible to cancel the screen effect produced by the copper tape in the air gap; it consists simply in interrupting that tape in the air gap like in the active section. Indeed, the slight conductivity of the mercury limits the forming of Foucault currents, but the resistance of the spire is increased in a zone where the calories produced by Joule effect are not dissipated. That second variant therefore affords substantial advantages only when the intensity of the currents in the conductive spire 12 is kept at relatively moderate figures. It should be observed that the pumping efforts in the reverse direction which then arise in that zone of the spire do not disturb the pumping efforts set up in the useful zone, since between these two zones, the conductive spire contains the copper tape which tends to prevent any movement of mercury.

FIG. 2a and FIG. 2b which is a cutaway view through B, B of FIG. 2a, show the case in which the conductive spire passes twice through the air gap as in the above examples, but in which the previously mentioned disadvantages are cancelled.

To simplify the description of that device, the same references have been used each time the components are the same.

The main magnetic circuit 1 provided with the windings 3 and 4 and its air gap 2, in which the conductive spire 12 surrounding the column 8 of the closed magnetic circuit fed by a single winding 10 will be passed is therefore seen as in FIG. 1. The pumping duct 5 for the liquid metal is flattened into a flat duct 6 as previously. Nevertheless, this time, the pumping duct flattened into the shape of a tape 6 is folded in a rounded half-loop 16 and passes twice through the air gap so that the flux of the liquid metal directed in one direction in the air gap at 6 in the upper passage, is directed in the opposite direction in the lower passage 6'. The direction of the magnetic field being the same in both cases, it is sufficient to make the conduction current pass in the reverse direction in the two passages for the Laplace forces to add together and effect a greater amount of work.

The conductive spire 12 folded in its plane in an axis contained in the plane of the air gap 2 enters the insulating duct 5 twice, at the level of the elements 6 and 6', thus giving rise to forces which will be added together in the pumping duct in which the liquid metal flows. It should be observed that the interference flowing of the metal contained in the conductive spire 12 is slowed down by the conductive tape 14, more particularly in the half-loop 17.

Figure 3B:
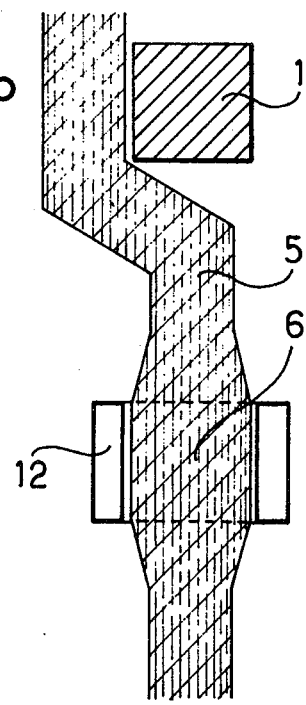
FIG. 3b is a sectional view of the pump of FIG. 3a taken about line B-B.

FIG. 3a and FIG. 3b which show a cutaway view of FIG. 3a through BB, correspond to a pumping device in which the two magnetic circuits 1 and 7 form a single assembly contained in a plane. That assembly is therefore constituted by a magnetic circuit 1 having an air gap and by a closed magnetic circuit 7 round which is wound the conductive spire 12. The winding 10 surrounds the column 8 common to the two magnetic circuits and is placed in the vicinity of the conductive spire 12. That conductive spire 12 makes an electric current perpendicular to the magnetic field set up in the air gap of the magnetic circuit pass in the liquid or molten metal contained in the flat pumping duct.

Due to the structure of the two magnetic circuits, the duct 5 will be cranked or laterally offset at the level of the upper part of the magnetic circuit 1 as shown diagrammatically in FIG. 3b.

A variant of that embodiment consists in forming an opening in the upper branch of the magnetic circuit 1 in order to avoid offsetting the insulating duct 5.

In certain embodiments, the position of the windings of the device corresponding to FIGS. 3a and 3b have also been changed, omitting the winding 10 and replacing it by an induction winding placed on the magnetic circuit 7.

In this latter device, an opening has been made in the upper branch of the circuit to obtain an insulant duct for the liquid metal having a simple shape.

When it is required to obtain the greatest pumping effect, an induction winding is arranged on the magnetic circuit 7 and on the central column 8.

The various circuits described above have been tried and used for pumping operations with various liquid or molten metals such as, for example, mercury and lead which have a resistivity in the order of a hundred or so microhms per centimetre at the operating temperatures.

In the case where the molten metal to be pumped has a chemical action on the tape or on the bar of metal immersed in the spire of molten metal, that tape or that bar may be protected against that chemical action by a protective layer of molybenum or nickel, for example, unless it is a greater advantage to use a nickel bar, as is the case with molten sodium.

In certain conditions of use, where the degree of purity of the liquid metal pumped is not critical, a certain chemical action of limited amplitude causing a slight loss of substance from the immersed conductive tape, leading, for example, to the replacing of the copper tape every 1000 hours of service, could even be tolerated.

Although the devices which have just been described may appear to afford the greatest advantages for implementing the invention, in a particular technical situation, it will be understood that various modifications may be made thereto without going beyond the scope of the invention, it being possible to replace certain of its elements by other elements, without going beyond the scope of the invention, as a function of the kind of metal to be pumped.

I claim:

1. In an electromagnetic pumping method suitable for liquid metals having low electrical conductivity, consisting in flowing through a pumping duct liquid or molten metal simultaneously, passing an electrical current flowing in a direction perpendicular to the axis of the pumping duct and applying to the liquid or molten metal a magnetic field perpendicular to the axis of the pumping duct and to the conduction current and confining the conduction current which originates in a conductive spire to a casing filled with the metal to be pumped, the improvement which comprises immersing a bar made of a material which is a good electrical conductor and immune to the chemical action of said conductive liquid metal in said conductive spire to increase current flow in said conductive spire.

2. In an electromagnetic pumping device comprising:

a first magnetic circuit including an air gap and having means for setting up, in its air gap, a magnetic field;

a pumping duct within which liquid or molten metal is to be pumped, having one of its ends in communication with a liquid or molten metal receptacle, said pumping duct crossing the air gap of the first magnetic circuit with the axis of said pumping duct at the air gap being perpendicular to the direction of the magnetic field;

a conductive spire containing liquid or molten metal crossing said pumping duct at least once in the air gap of said first magnetic circuit, through openings provided in said pumping duct;

a second closed magnetic circuit, provided with at least one induction spire surrounded by the liquid metal conductive spire; the improvement comprising: a conductive bar contained in the conductive spire and being interrupted at least once at said air gap.

3. The electromagnetic pumping device according to claim 2, wherein the pumping duct in which the liquid metal being pumped flows is rectangular in the vicinity of the air gap and wherein the conductive spire retains a rectangular shape throughout its whole length.

4. The electromagnetic pumping device according to claim 3, wherein the conductive bar inserted in the conductive spire and immersed in the liquid or molten metal is in the shape of a tape.

5. The electromagnetic pumping device according to claim 4, wherein the conductive spire passes only once through the air gap of the first magnetic circuit and wherein the first magnetic circuit comprises at least one winding arranged in the vicinity of the air gap.

6. The electromagnetic pumping device according to claim 4, wherein the conductive spire passes twice through the air gap.

7. The electromagnetic pumping device according to claim 6, wherein at the place where the air gap is crossed for the second time, the conductive tape contained in the conductive spire is interrupted a second time.

8. The electromagnetic pumping device according to claim 4, wherein the conductive spire and the pumping duct conveying the liquid metal pumped each pass twice through the air gap, and said pumping duct forms a half-loop outside the air gap.

9. The electromagnetic pumping device according to claim 8, wherein; in the air gap, the conductive spire enters the pumping duct twice; once before and once after the half-loop of the said pumping duct.

10. The electromagnetic pumping device according to claim 4, wherein the first magnetic circuit and the second magnetic circuit comprise a common branch about which the conductive spire is wound.

11. The electromagnetic pumping device according to claim 10, wherein a feed winding is connected up to the said common branch.

12. The electromagnetic pumping device according to claim 10, wherein a feed winding is connected to the second magnetic circuit.

13. The electromagnetic pumping device according to claim 10, wherein an induction circuit is connected up to the branch inherent to the first magnetic circuit and an induction circuit is connected up to the common branch.

14. The electromagnetic pumping device according to claim 10, wherein the magnetic circuit includes an upper branch and the pumping duct conveying the liquid metal pumped is laterally offset at the level of the upper branch of the magnetic circuit.

15. The electromagnetic pumping device according to claim 10, wherein the magnetic circuit comprises an upper branch and the upper branch of the magnetic circuit contains a passage for the pumping duct conveying the liquid metal pumped.

* * * * *